Aug. 12, 1969   R. E. BLEWITT, JR   3,460,832
BOWLING BALL PATH INDICATOR

Filed May 28, 1965 — 8 Sheets-Sheet 1

INVENTOR
ROY E. BLEWITT JR.
BY
ATTORNEY

Aug. 12, 1969     R. E. BLEWITT, JR     3,460,832

BOWLING BALL PATH INDICATOR

Filed May 28, 1965     8 Sheets-Sheet 2

INVENTOR
ROY E. BLEWITT JR.

BY
ATTORNEY

Aug. 12, 1969  R. E. BLEWITT, JR  3,460,832
BOWLING BALL PATH INDICATOR
Filed May 28, 1965  8 Sheets-Sheet 3

FIG. 4

INVENTOR
ROY E. BLEWITT JR.
BY
*Stewart F. Moore*
ATTORNEY

R. E. BLEWITT, JR

3,460,832

BOWLING BALL PATH INDICATOR

Filed May 28, 1965

INVENTOR
ROY E. BLEWITT JR.
BY

ATTORNEY

United States Patent Office 3,460,832
Patented Aug. 12, 1969

3,460,832
BOWLING BALL PATH INDICATOR
Roy E. Blewitt, Jr., Southport, Conn., assignor to American Machine & Foundry Company, a corporation of New Jersey
Filed May 28, 1965, Ser. No. 459,697
Int. Cl. A63d 5/04
U.S. Cl. 273—54                     10 Claims

ABSTRACT OF THE DISCLOSURE

A bowling ball path computer and indicator including a central computer having a plurality of output lines each of which represents a Boolean expression for and is energized in response to a particular standing and fallen pin combination (but independent of the number of pins standing) detected by any one of a group of associated pinsetters. Each pinsetter circuit includes a stepping switch which scans the output lines in a predetermined order of priority and actuates a selected ball path indicator upon encountering the first occurring energized output line.

---

This invention relates to apparatus for automatic bowling pinspotting machines and more particularly to improvements in apparatus for selecting and indicating to a player the point of entry which a bowling ball should have when entering an array of standing pins in order to knock down the maximum number of such pins.

The present invention is an improvement in point of entry indicating systems for bowling pinspotting machines, usually referred to as "ball path indicating systems," of the type disclosed in Gruss et al. application, Ser. No. 166,616, filed Jan. 16, 1962, and now Patent No. 3,212,779 for Bowling Pin Indicating System, and in Roy E. Blewitt, Jr. application Ser. No. 240,636 filed Nov. 28, 1962, and now Patent No. 3,223,416 for Bowling Ball Path Indicator. Such ball path indicating systems generally include for each pinspotting machine, means, operative prior to the rolling of the ball of a frame, for determining the number and arrangement of standing pins, which means is associated with means for computing and selecting the optimum point of entry into an array of standing pins, which the next ball should take to achieve maximum scoring results. Further, for each pinspotting machine an indicator is provided, coupled to the computer, which is actuated to indicate to the bowler the optimum point so selected. The bowler, by following the visual directions provided by the indicating system, rolls his ball accordingly and, if his aim is true, will knock down the maximum numbers of standing pins each time.

Apparatus of the type disclosed in the aforementioned Blewitt application is suitable for computing the optimum point of entry for each machine of a bowling establishment having up to 10 pinspotting machines. Beyond this number, it has been found that the relay circuit arrangements for selecting machines whose ballpath points of entries are to be computer, become overly complex and slow in action, and thus preclude the use of additional machines to share the same computer. Furthermore, it has been found that the operation of the computer unit itself was too slow for more than 10 pinspotting machines, as at least for many of the selected standing pin combinations, the number of pins left standing must be determined and such information stored until the computation is completed.

Many bowling establishments are large and may have as many as 50 pinspotting machines. It is desirable to provide a ball path point of entry indicating system which is sufficiently flexible to accommodate almost any number of pinspotting machines. It is also desirable to be able to use a single point of entry computer having high speed computing capabilities, which is able to compute the optimum point of entry for any desired number of machines and be cleared in a minimum amount of time, without the necessity of totalizing and storing the total number of standing pins in each selected pin combination. Since it is additionally desirable to have a single computer for each establishment no matter how many pinspotting machines are installed therein.

It is therefore an object of the invention to provide a system for indicating an optimum point of entry of a bowling ball into an array of standing pins, which is adapted to compute the point of entry for a large number of pinspotting machines and which utilizes a single high-speed computer for such computation.

It is a further object of the invention to provide a high-speed computer for a point of entry indicating system which eliminates the necessity for counting and storing the total number of standing pins in order to perform the computing function of determining the optimum point of entry that a bowling ball should take when entering an array of standing pins.

It is another object of the invention to provide a high-speed computer, formed from solid state circuit components which computes the optimum point of entry that a bowling ball should take when entering an array of standing pins, with such computation being performed in accordance with information representative only of the identity of the standing pins of a selected pin combination.

It is yet another object of the invention to provide improved electrical circuit arrangements for detecting in a minimum amount of time, any one of a number of bowling pinspotting machines which is ready to have its optimum point of entry computed and for transmitting information representative of the identity of standing pins into a high-speed computer, adapted to select the optimum ball path in accordance with a selected standing pin combination.

The present invention may be more accurately described as an improved system for computing and indicating the optimum point of entry of a bowling ball into a selected array of standing pins in order to knock down the maximum number of such pins. However, for the sake of brevity and in conformity with the terminology commonly used in the bowling art, this invention will hereinafter be referred to as a ball path indicating system.

For a better understanding of the invention, together with further objects thereof, reference is made to the following detailed description taken in connection with accompanying drawings in which:

FIG. 2 is a portion of a pinspotting machine control circuit.

FIG. 14 shows the manner in which FIGS. 1, 4–9 are to be arranged to effect a complete circuit diagram of the control and computer circuitry embodying the features of the present invention.

The embodiment of the invention illustrated herein is adaptable for use with a plurality of any known automatic pinspotting machines of the general type which spot and respot pins, remove fallen pins from the bowling alley deck, and which operate in accordance with the various ball cycles required by the rules of the game of bowling, viz., first and second ball, strike, and foul cycles.

Figures 1, 10, 11, 12, 13:
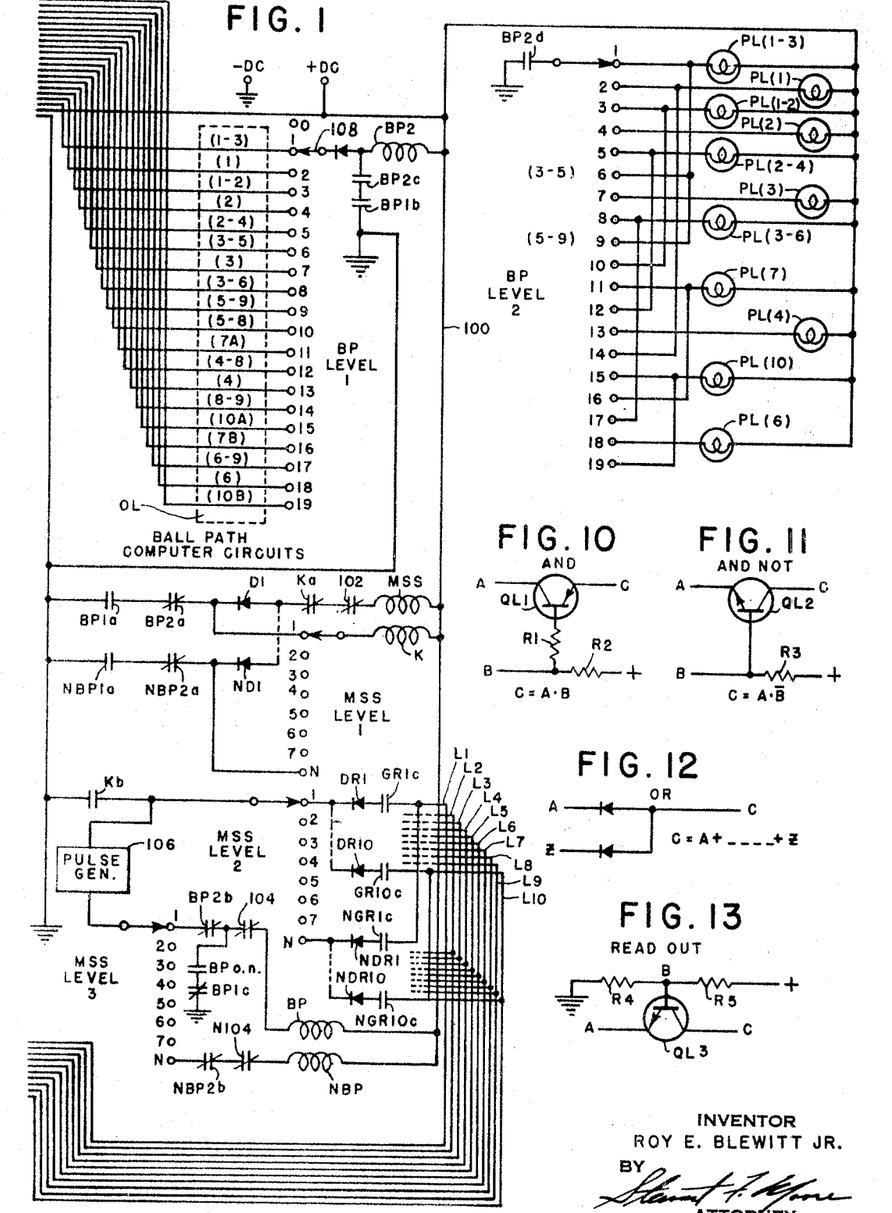
FIG. 1 is a schematic diagram of the ball path indicating system control circuit for a plurality of pin-spotting machines.
FIG. 10 is a schematic representation of an AND unit as employed in the computer circuit diagram of FIGS. 4-9.
FIG. 11 is a schematic representation of an AND NOT unit as employed in the computer circuit diagram of FIGS. 4-9.
FIG. 12 is a schematic representation of an OR unit as employed in the computer circuit diagram of FIGS. 4-9.
FIG. 13 is a schematic representation of a Readout unit as employed in the computer circuit diagram of FIGS. 4–9.
Figures 2, 14:
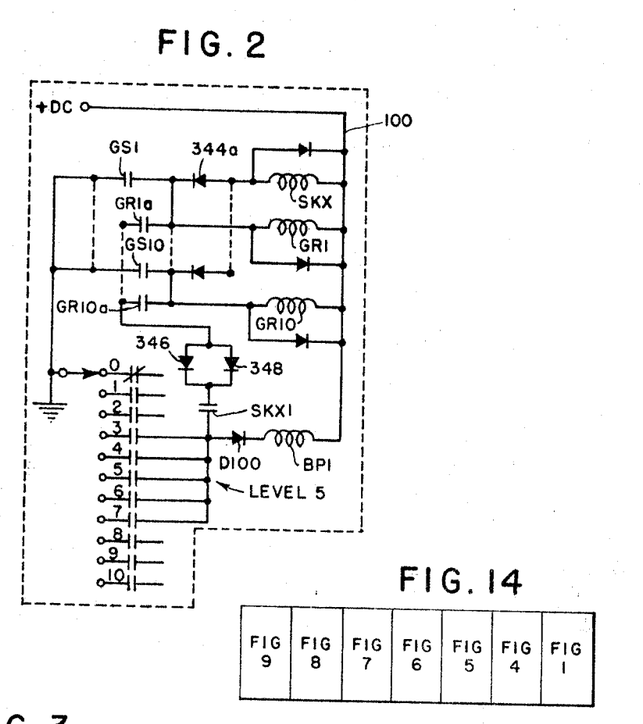

Referring now to the drawings, and particularly FIGS. 1 and 2, a schematic diagram of a control circuit of a ball path indicating system for $n$ number of pinspotting machines is shown. One of the features of the improved ball path indicating system of the present invention is that it may be adapted to determine and indicate the optimum ball path for a very large number of pinspotting machines that may be located in a given establishment. For example, in at least one installation the invention, with its single ball path computer, has been operated successfully in connection with about 50 pinspotting machines.

Figure 3:
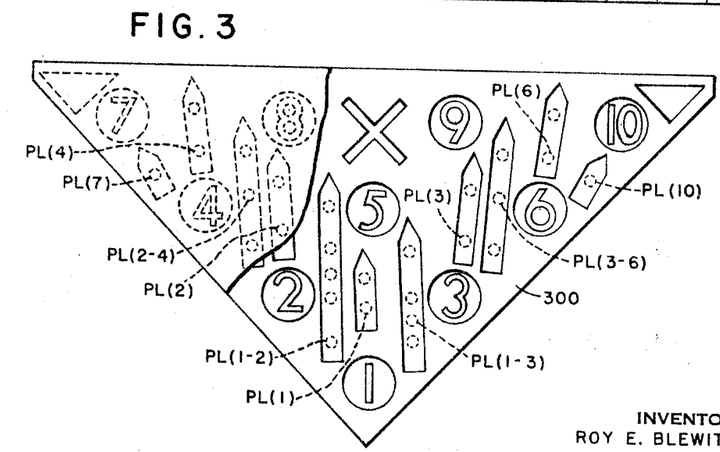
FIG. 3 is a plan view of an embodiment of a ball path indicator.

In general, the system includes a single, high-speed, centrally located solid state ball path computer for determining according to information fed thereto as to the identity or position of standing pins after a ball has been rolled, the optimum ball path selected from a pre-determined number of preselected paths which a ball should take, when entering an array of a selected combination of standing pins, in order to knock down the maximum number of such pins. Each pinspotting machine has a facsimile of the pin deck which displays to the bowler the number and position of standing pins, and also indicia associated with the standing pin display and selectively actuated by the computer for indicating the optimum predetermined ball path. Such a facsimile is shown in FIG. 3.

Each pinspotting machine also has detecting means for determining, at a selected interval during the operating cycle of the machine, the identity or position of the standing pins on the pin deck. The identification information is translated into pin position information signals which are fed to the input of a high-speed solid state ball path computer. Circuit means are also provided for preventing any of the other machines from actuating the computer during the instant that the ball path is being computed. As soon as the optimum ball path for a standing pin combination has been computed, corresponding indicia on the pin deck facsimile display associated with the machine is actuated. The computer is then immediately cleared and conditioned for receiving information from another machine as to its standing pin combination. Each machine has holding means associated therewith for maintaining its ball path indicating indicia in a visible condition until the bowler chooses to roll another ball and cause such machine to continue to progress through its operating cycle.

Since the cycling operations of any conventional pinspotter machine with which the present invention is associated are unchanged by the novel ball path indicating system of the present invention, a description of the operation of the machine in general and in particular an electrical control system therefor, will not be offered herein but may be found fully described in R. E. Blewitt, Jr., U.S. Patent 2,983,510 dated May 9, 1961, or in R. E. Blewitt, Jr., application S.N. 195,927 filed May 18, 1962, and now Patent No. 3,231,272 entitled Bowling Pinspotting Machine Control Mechanism. While the present invention is particularly adapted to be operatively associated with pinspotting machines of the type shown and described in the aforesaid Blewitt patent and application, yet any machine operating in accordance with conventional bowling game rules may be used, provided it has a detecting system capable of detecting the presence of standing pins after a first ball of a playing frame has been rolled.

In machines of the type described in the aforesaid Blewitt patent and application, a switch associated with each pin respotting unit is actuated at the moment when, during a first ball cycle, the conventional machine table carrying such respotting units descends towards the alley floor and picks up the standing pins. For purposes of illustration, such a detecting system is incorporated in the present invention, and by way of example, a portion of the control circuit of FIG. 3 of Blewitt application S.N. 195,927 is shown in FIG. 2.

In particular, FIG. 2 shows a portion of the circuitry associated with level No. 5 of a stepper relay SR1 of the Blewitt control circuit. The pinspotting machine which the control circuit is adapted to control, has a normally open switch GS1–10 associated with each pin gripper. As the moveable table of the pinspotting machine begins to lift the standing pins from the deck by means of its associated grippers, those gripper switches GS1–10 corresponding to the pins which have been left standing will close, thereby energizing the corresponding relay GR1–10 through a circuit comprising one of the contacts GS1–10, through the coils of one or more relays GR1–10 to a source of positive D.C. potential. Simultaneously with the energizing of one of relays GR1–10, a relay SKX is energized through a circuit comprising any one of the gripper switches GR1–10 and one or more of diodes 344$a$–$j$. As is fully described in detail in the Blewitt application, the table of the pinspotting machine continues to perform its pin respotting functions while travelling through a first ball cycle, and simultaneously therewith stepper relay SR1 advances to step 3.

On step 3, the previously energized pin detector relays GR1–10 remain energized through a circuit comprising contacts of step 3 of level 5 of stepping relay SR1, closed contacts SKX1, diodes 346, 348, and the closed contacts of the group comprising GR1$a$–10$a$ to the coil relay GR1. Relay coil SKX will remain energized through the circuit comprising one or more of diodes 344$a$–$j$, one or more of the contacts GR1$a$–10$a$ of relays GR1–10, diodes 346, 348, contacts SKX1 and step 3 of level 5 of relay SR1. All of relays GR1–10 will then remain energized until the stepper relay has left step 7. Connected to the plus D.C. line 100 is one terminal of a coil of a relay BP1 which has its second terminal connected in series with a diode D100 and terminal 3 of level 5 of stepper relay SR1. Relay BP1 is not shown in FIG. 3 of Blewitt application S.N. 195,927.

Referring to FIG. 1, a machine selector stepper relay is provided, which has an actuating coil MSS, with one terminal connected to line 100, which in turn is connected to a suitable source of positive D.C. potential. The negative terminal of the D.C. source is connected to ground. The other terminal of stepper relay coil MSS is connected to ground through a series circuit comprising its own interrupter contacts 102, normally closed contacts K$a$, diode D1, normally closed contacts BP2$a$, and contact BP1$a$. Contacts BP1$a$ are actuated by relay BP1, which, are mentioned above, is associated with the control circuitry of each pinspotting machine.

The machine selector circuitry of the present invention is adapted to handle a large number of machines and is easily capable of handling at least 50 machines by merely increasing the number of contacts on machine stepper switch MSS or by connecting a number of such stepper relays in series to provide a contact on each contact level for each machine. Therefore it would be understood that while stepper relay MSS may have a large number of contacts, only a few contacts are shown in FIG. 1 by way of example, and the last contact is indicated as the $n$th contact. Accordingly, connected to contact $n$ of stepper relay MSS level No. 1 are normally open contacts NBP1$a$ and normally closed contacts NBP2$a$. Contact $n$ is also connected to normally closed contact K$a$ through a diode ND1. The coil of the relay K which actuates contacts K$a$ and K$b$ is connected between the wiper arm of stepper relay MSS level No. 1 and line 100.

When a particular machine is ready to have its ball path computed, the BP1$a$ contact associated with the machine closes through operation of its relay BP1, thereby energizing the circuit to the machine selector stepping relay MSS through contacts BP1$a$ now closed, contacts BP2$a$, diode D1, normally closed contacts K$a$ and interrupter contacts 102. Stepper relay MSS, through action of its interrupter contact 102 then starts searching for the machine which is ready to have a ball path computed. When it reaches the contact step associated with that machine, relay K is energized through the associated machine contact of level 1 of stepper relay MSS, and contacts BP1$a$ and BP2$a$ of the aforementioned machine. When relay K is energized, contact K$a$ is opened, thereby preventing further stepping action of stepper relay MSS. Therefore, any other machine whose ball path is ready to be computed, is prevented from actuating the system, until the appropriate, normally closed contacts BP2$a$–NBP2$a$ are opened.

The pin detector relays GR1–GR10 (FIG. 2) have normally open contacts GR1$c$–GR10$c$ (FIG. 1) connected in series with associated diodes DR1–DR10 to one of the contacts of level 2 of stepper relay MSS. Contacts GR1$c$–10$c$ are also connected to lines L1–L10 respectively. Lines L1–L10 are the input lines to the ball path computer shown in FIGS. 4–9 and which will be described in greater detail hereinafter. Each pinspotting machine has a set of contacts GR1$c$–10$c$ connected to computer input lines L1–L10, and are accordingly indicated in FIG. 1 as contacts NGR1$c$–NGR10$c$.

When relay K is energized, contacts K$b$ close and connect the appropriate contact of stepper relay MSS level No. 2, associated with the machine whose ball path is to be computed, to ground. The standing pin information for the selected machine is represented by those contacts of the group GR1$c$–GR10$c$ which are closed, depending on which of the pins 1–10 remain standing, and such information is therefore provided to the input of the ball path computer (FIGS. 4–9) via lines L1–L10.

The function of the ball path computer, of course, is to provide an output signal, representative of the optimum path that a ball should take in entering a selected combination of standing pins, which combination is represented by the signals fed into the ball path computer by means of lines L1–10, and which output signal may be utilized to actuate an appropriate indicating device. Accordingly, and ignoring for the moment the circuitry involved, the output signals from the ball path computer shown in FIGS. 4–9 are read out of the computer by means of output lines OL indicated by the dotted box in FIG. 1. Each line OL is designated by the ball path which it represents as follows:

OL(1–3), OL(1), OL(1–2), OL(2), OL(2–4),
OL(3–5), OL(3), OL(3–6), OL(5–9), OL(5–8),
OL(7A), OL(4–8), OL(4), OL(8–9), OL(10A),
 OL(7B),
OL(6–9), OL(6), OL(10B).

Each of the OL lines is connected to one of the 19 contacts of level No. 1 of a stepper relay BP. Each of the pinspotting machines has a stepper relay BP associated therewith, so that for a given assembly of machines, there are $n$ BP relays.

The actuating coil for each BP relay, similarly designated as BP, is connected between +D.C. line 100 and a selected contact of level 3 of stepper relay MSS, via its own interrupter contacts 104 and normally closed contacts BP2$b$. As in the case of the other levels of stepper relay MSS, level 3 has an $n$ contact to which is connected the coil for the $n$th BP stepper relay via contacts N104 and NBP2$b$.

Connected to the wiping arm of stepper relay MSS level 3 is a pulse generator 106 which is also connected to the wiping arm of level 2 of stepper relay MSS. Pulse generator 106 may be any suitable, conventional pulse generating device which is adapted to emit a train of pulses of sufficient duration and magnitude to cause stepper relay BP to sweep its 19 contacts in response to the pulse energization of its actuating coil BP. Thus, immediately upon the closing of contacts KB, pulse generator 106 is actuated, causing the ball path stepper BP of the selected machine to start to search the closed ball path circuits of the computer by scanning the contacts of level 1 to which computer read-out leads OL are connected. The scanning will be conducted at the frequency of the pulse generator through the action of stepper coil BP, its interrupter contacts 104, and normally closed contacts BP2$b$.

Ignoring momentarily exactly how the ball path circuits of the computer, as shown in FIGS. 4–9, operate, when the wiping arm of level 1 of stepper relay BP reaches a step corresponding to a closed or completed ball path circuit, a connection is made between ground and that contact of level No. 1 to which the completed ball path circuit is connected. Connected to the wiping arm of level 1 of stepper relay BP via diode 108 is the actuating coil of a relay BP2, which is also connected to line 100. Accordingly, when the wiping arm of level 1 contacts a completed ball path circuit, relay BP2 is energized. Once energized, relay BP2 will remain energized through its own contact BP2$c$ and contacts BP1$b$, both of which are now closed and which are serially connected between one terminal of relay coil BP2 and ground. The contact BP1$b$ was, of course, closed when relay BP1 (FIG. 2) was actuated.

As soon as relay BP2 is energized, the circuit to stepper relay coil BP is opened, through the opening of normally closed contacts BP2$b$, thereby preventing stepper relay BP from advancing further. However, normally closed contacts BP2$a$ are now open, thereby filling stepper relay MSS to search for the next machine which is in condition to have its ball path computed.

Stepper relay BP has a second level designated as level 2, which has 19 contacts similar to level 1, but which are interconnected with each other and to one of a group of 11 ball path lamps BPL (1–3)–(10). These ball path lamps are also connected to line 100 so that positive D.C. may be applied thereto.

Although 19 discrete ball path choices are available in accordance with the embodiment of the invention disclosed herein, for practical purposes 11 ball path indicia are used. The ball path indicia may be in the form of arrows on a pin deck facsimile 300 as shown in FIG. 3. The 11 ball path lamps may be mounted so as to illuminate one of the selected indicia and these are indicated as PL(1–3), PL(1), PL(1–2), PL(2–4), PL(2), PL(3), PL(3–6), PL(4), PL(6), PL(7), PL(10). The parenthetical reference numerals designate the position of the ball path indicia with respect to adjacent conventional pinspot nomenclature, which is also displayed on facsimile 300. For example, referring to FIG. 3, the lamp indicated as PL(1–3) illuminates the arrow position between pins 1 and 3 on facsimile 300.

Referring again to FIG. 1, the wiper arm of level 2 of stepper relay BP is connected to ground via normally open contacts BP2$d$. Thus when relay BP2 is energized, its contacts BP2$d$ close and provide a path to ground for the lamp connected to the contact of level 2 on which stepper relay BP has stopped, thus allowing such lamp to be energized. It will be noted that the contact associated with the unused outputs of the computer ball path circuits are connected in parallel with active contacts of level 2 of stepper relay BP in order that a single ball path indicia may function in place of several of the unused ball path selections. For example, lamp PL(1–3) will light not only when the ball path circuit connected to the No. 1 contact (1–3 contact) of level 1 is completed, but also if the (3–5) or the (5–9) ball path computer circuits are also closed. In a like manner, ball path lamp PL(1) will be illuminated when ball path computer circuit (8–9) is closed and, in a similar manner, ball path lamp PL(1–2) will light when computer circuit 5–8 is completed. Likewise, lamp PL(2–4) will light when ball path circuit (2–4) or (4–8) is completed. Lamp PL(3–6) will light when computer circuits (3–6) and (6–9) are closed and lamp PL(7) will light when computer circuits (7A) and (7B) are closed. Also lamp PL(10) will light when computer circuits (10A) and (10B) are closed. The lamp corresponding to the selected ball path will be energized and remain energized as long as relay BP2 remains energized and the wiper arms of the two levels of steppers BP remain at the selected position.

Energizing of relay BP2 also opens normally closed contacts BP2a, as mentioned above, and interrupts the circuit to relay K and to the actuating coil of the machine seletcor stepper MSS. Contact Kb is also opened when relay K becomes de-energized, thereby removing the pin information of the selected machine from computer input lines L1–10. The computer is therefore cleared and conditioned for receiving pin position information from another machine. If another machine is ready to have its ball path computed, stepper relay MSS will then advance its wiping arms and scan its associated contacts to search for the next machine which has a closed BP1a contact.

The selected lamp PL(1–3)–(10) will remain energized so that the information now on the ball path indicator facsimile 300, as to the indentity of the standing pins and the proper ball path point of entry that a ball should take to knock down the number of pins, remains displayed to the bowler until stepper relay SR1, level 5 (FIG. 2) of the selected machine control circuit advances beyond step 7 on the rolling of the next succeeding ball of a frame. When this occurs relay BP1 is de-energized thus allowing contacts BP1b to open and de-energize relay BP2. De-energizing of relay BP2 allows contacts BP2d to open and de-energize whichever of lamps PL(1–3)–(10) was illuminated.

Ball path computer

The ball path computer will now be described in connection with FIGS. 4–9 which show in detail the circuitry thereof. The number of ball paths to be indicated to the bowler and positioning of the ball path indicia on facsimile 300 are both a matter of choice. In practice it has been found that 11 discrete ball path indications are ample without confusing the bowler. However, as mentioned above, the computer is capable of selecting any one of 19 arbitrarily chosen optimum ball paths.

FIGS. 4–9 show in detail the individual circuits for completing a path to ground from each of the contacts of level 1 of stepper relay BP. As mentioned above, enabling any one of these circuits will establish the respective ball path indication associated with the enabled circuit. Generally, these circuits are formed from combinations of the basic logic units AND, OR, AND NOT, readout, and employ transistor and diode elements for their implementation. Typical logic units which may be utilized in the ball path computer circuits are shown in FIGS. 10–13.

By way of illustration, the AND unit may comprise a PNP transistor QL1, a base resistor R1, and a bias resistor R2. When a ground is provided at terminals A and B, transistor QL1 will be in a condition ready to conduct if a positive signal is applied to point C. Therefore, if a relay or other output device is connected to point C and to a positive supply voltage. Such a device will be energized. If a ground is provided only at point A and not point B, the positive bias voltage applied to the base of transistor QL1 will prevent it from conducting any current. If a ground is provided at point B but not at point A, resistor R1 will limit the amount of current which may be conducted by the transistor QL1 through its base to a value below that which is necessary to operate the output device. Consequently, in order to provide a signal at terminal C sufficient to operate an output device, both A and B must be grounded.

Referring to FIG. 11, the AND NOT unit comprises an NPN transistor QL2 and a bias resistor Re. When terminal A is grounded and terminal B is not required, the current flowing from the positive bias source to bias resistor R3 and the base of transistor QL2 to the emitter and to terminal A, will permit the transistor to conduct such that if a posiive signal is applied at point C, the transistor QL2 will conduct. Therefore, if an output device is connected between terminal C and a source of positive supply voltage, when terminal A is grounded and terminal B is not grounded the output device will be energized. When terminal A is not grounded, no current will flow through the transistor QL2 regardless of whether or not terminal B is grounded. When both terminals A and B are grounded current cannot flow from the base to the emitter of the transistor QL2 since they are both at the same potenial. Therefore, in this condition transistor QL2 cannot conduct at all. Consequently in order for an output device to be operated by this unit, a ground signal must be present at terminal A and not at terminal B.

Referring to FIG. 12, the logic unit illustrated therein is a standard diode OR unit which comprises any number of diodes, the anode terminals of which are connected together such that if the cathode terminal of any of these diodes is grounded, a conducting path from terminal C through the grounded diode will be formed. Consequently a ground at A or B or Z will operate an output device which is connected between terminal C and a source of positive supply voltage.

In FIG. 13 the fourth logic unit designated as a Readout Unit is shown. This unit comprises an NPN transistor QL3 and a voltage divider unit comprising resistors R4, R5 which are connected to the base of transistor QL3. This transistor serves two purposes. First of all, it acts as a buffer unit which is necessary to protect the other transistors in a particular logic circuit in the event that the voltage at terminal C rises above the normal breakdown voltage of the transistors. By setting the voltage at terminal B of transistor QL3 at such a value that the voltage developed between terminal C and terminal B never exceeds the breakdown voltage of transistor QL3, all of the other transistors will be protected thereby, since, in the illustrated embodiment, an equivalent of transistor QL3 is serially connected between a source of positive voltage and all of the other transistors in each associated ball path computing circuit via terminals A and B of transistor QL3.

The second function of the Readout Unit is to further limit the amount of current which may flow through an AND unit whenever only the base signal is present for that unit. The operation of the Readout Unit is such that if terminal A is grounded, the current which flows from the source of positive bias indicated by the + designation to resistor R5 and the base of transistor QL3 to the emitter thereof will permit current to flow through the transistor QL3, such that if an output device of a positive supply voltage is connected to terminal C, the output device will be energized. If, however, a high resistance ground is connected to terminal A, such as an AND unit with only the base signal present, the current which will flow through this high resistance is limited to that flow which will cause the voltage at terminal A of the Readout Unit to be equal to the voltage at terminal B, since beyond this point the transistor QL3 will not conduct.

Referring again to FIGS. 4–9, many of the circuits shown therein are electrical representations of Boolean algebra expressions. Each expression represents a selected standing and/or fallen pin condition. By combining mathematically certain of these expressions, a general Boolean expression may be written for each of the 19 ball path indicator indicia which collectively, will designate an optimum ball path indicia for any one of the 1,023 possible standing pin combinations. This is achieved by expressing in Boolean notation, and following the logic rules discussed above, the fact that for every combination except a strike, some pins will always remain standing and some will not; and that a certain few of the ball path indicia will serve as indicators for most of the standing pin combinations, for example, the 1–3 indicator handles 255 combinations. Accordingly, the need to count standing pins is eliminated and only the position of these pins need be known.

A summary of all of the Boolean expressions for the standing and fallen pin combinations is set forth below and is arranged according to the indicator indicia which will be actuated when a combination is detected.

$$(1-3)=1[(3+6)[5+(\overline{4+7+8})]+3(\overline{2+4+8})$$
$$+6\{(\overline{2+7+8})+(\overline{2+3+4+7})+10[\overline{2+3})+\overline{8}]\}$$
$$+9[(\overline{5+8+10})+(3+6)(\overline{2+8}+4)]$$
$$+7[(\overline{2+4+8+9+10})+9(\overline{2+4+5})]]$$
$$(1)=1\{9[2(3+4+7)+10\cdot\overline{6}(2+8)]$$
$$+8(2+3+9)(\overline{4+6+7+10})+5(\overline{2+10})\}$$
$$+(1+5)(\overline{2+3+4+6+7+8+9+10})+\overline{1}\cdot 2\cdot 3$$
$$(1-2)=1+2\{5\cdot\overline{10}(\overline{7}+4)+9[\overline{5}\cdot 8+(\overline{4+6+7+10})]\}$$
$$(2)=8\{2[5(\overline{4+7})+(\overline{6+10})+6(\overline{4+10})]$$
$$+(\overline{3+4+5+6+7+9})\}+2(\overline{4+6+7+10})+\overline{2}\cdot 4\cdot 5$$
$$(2-4)=2[4+7+\overline{6}+(\overline{9+10})]$$
$$(3-5)=3\{5[(\overline{6+7+10})+9(\overline{6+7})+8(\overline{6+10})]$$
$$+8[(\overline{4+7+9+10})+9(\overline{4+6+10})]\}$$
$$(3)=(3\{9[\overline{4+6+10})+(\overline{6+7+10})+(\overline{4+6+7+8})$$
$$+(\overline{4+7+8+10})+5\cdot\overline{6}]+5(\overline{7+10})]\}$$
$$+(3+9)(\overline{4+5+6+7+8+10})+\overline{3}\cdot 5\cdot 6$$
$$(3-6)=3[\overline{4}+6+10+(\overline{7+8})]$$
$$(5-9)=5(7\cdot\overline{9}+9\cdot\overline{10})$$
$$(5-8)=5$$
$$(7A)=4\cdot\overline{6}(9+10)$$
$$(4-8)=4\cdot 8(\overline{7+10})$$
$$(4)=4[(\overline{7+9+10})+6(\overline{9+10})]+\overline{6}\cdot 7\cdot 8$$
$$(8-9)=\overline{6}\cdot 8$$
$$(10A)=6\cdot 7(\overline{4}+9\cdot 10)+\overline{7}\cdot 8$$
$$(7B)=7(\overline{9+10})$$
$$(6-9)=9\cdot\overline{10}$$
$$(6)=9+4+6\cdot\overline{10}$$
$$(10B)=10$$

Figure 4:
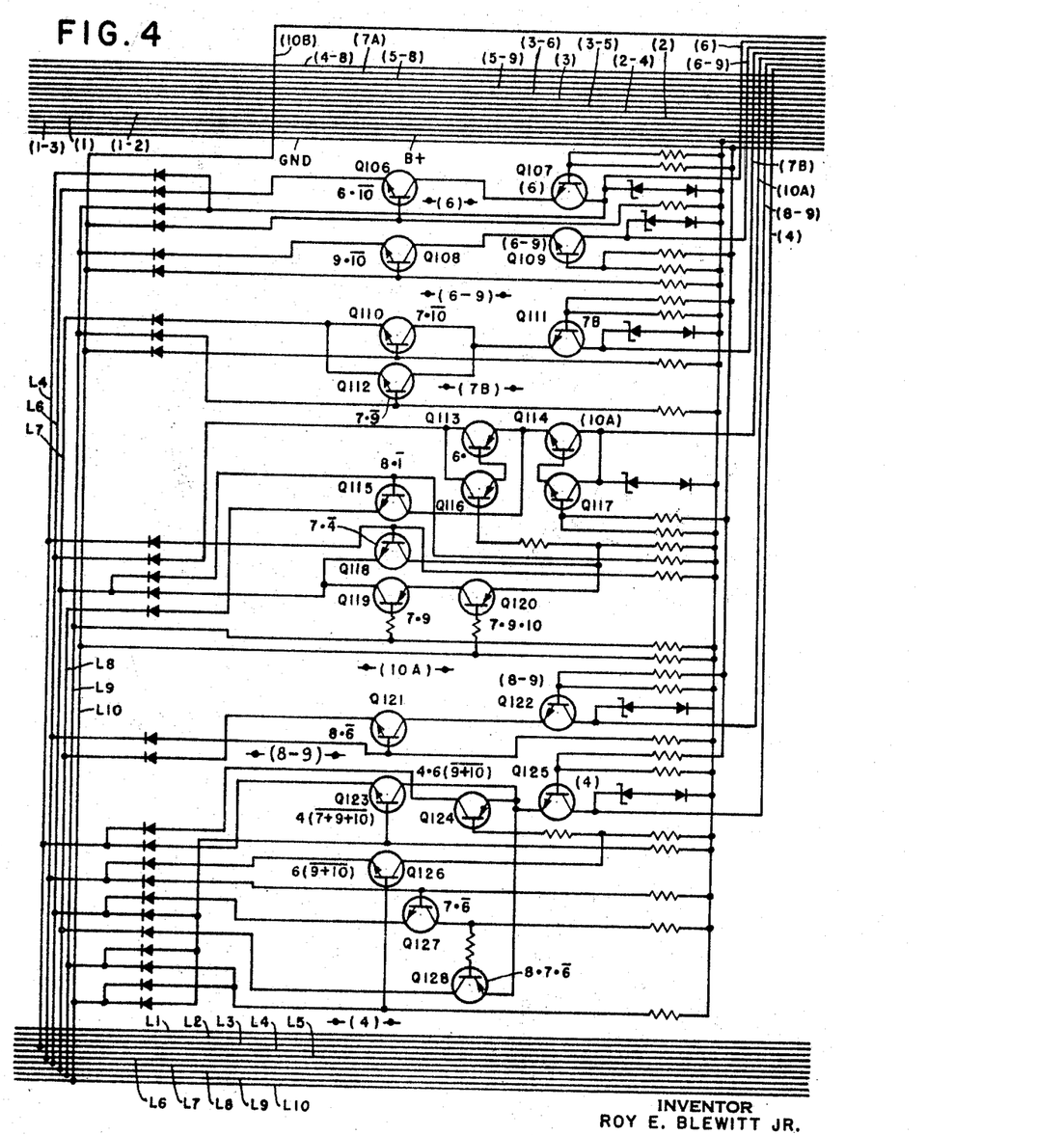
FIGS. 4-9 is a continuous schematic diagram of the solid state ball path computer for a multiple pinspotting machine, ball path indicating system.
Figure 5:
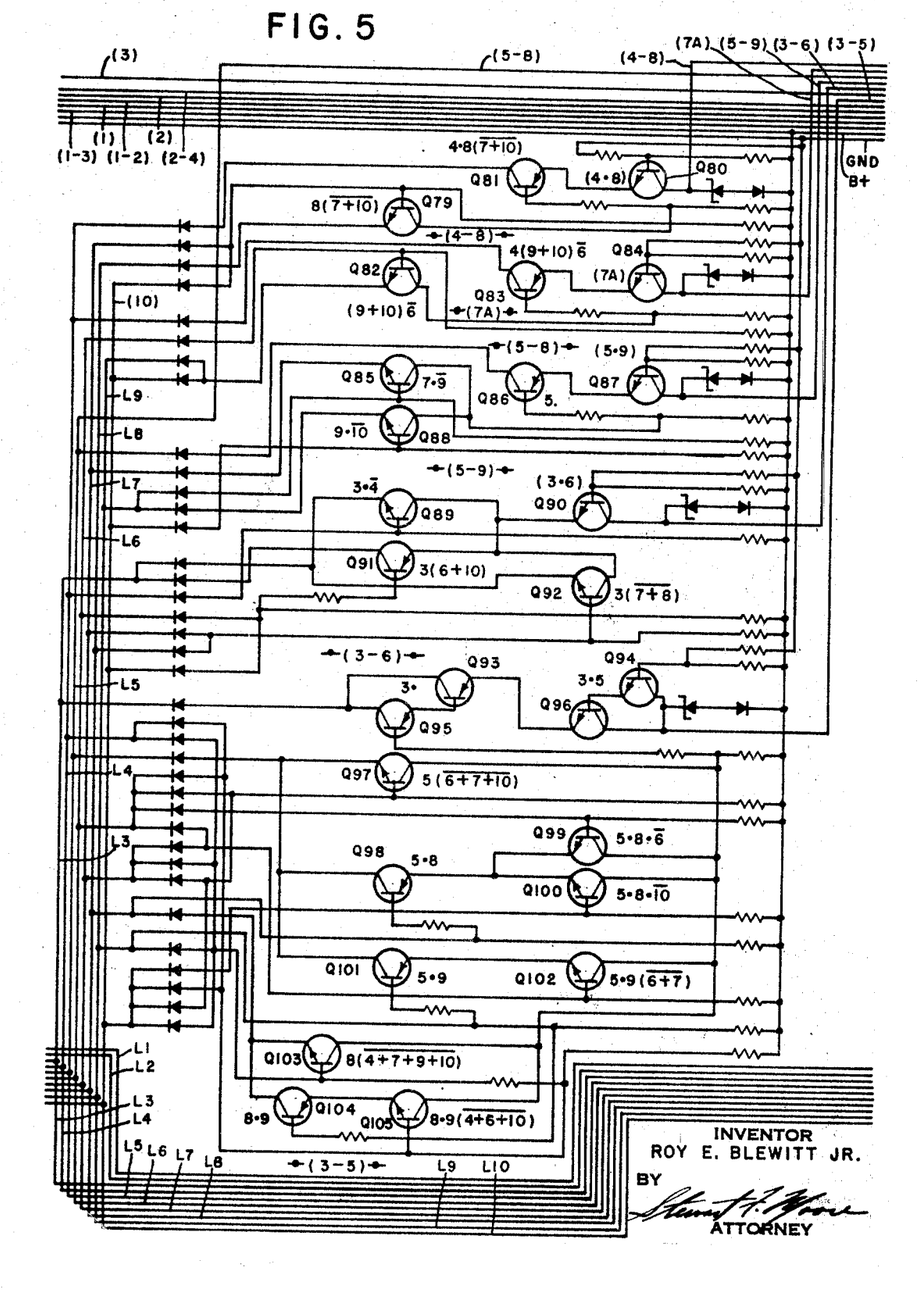
Figure 6:
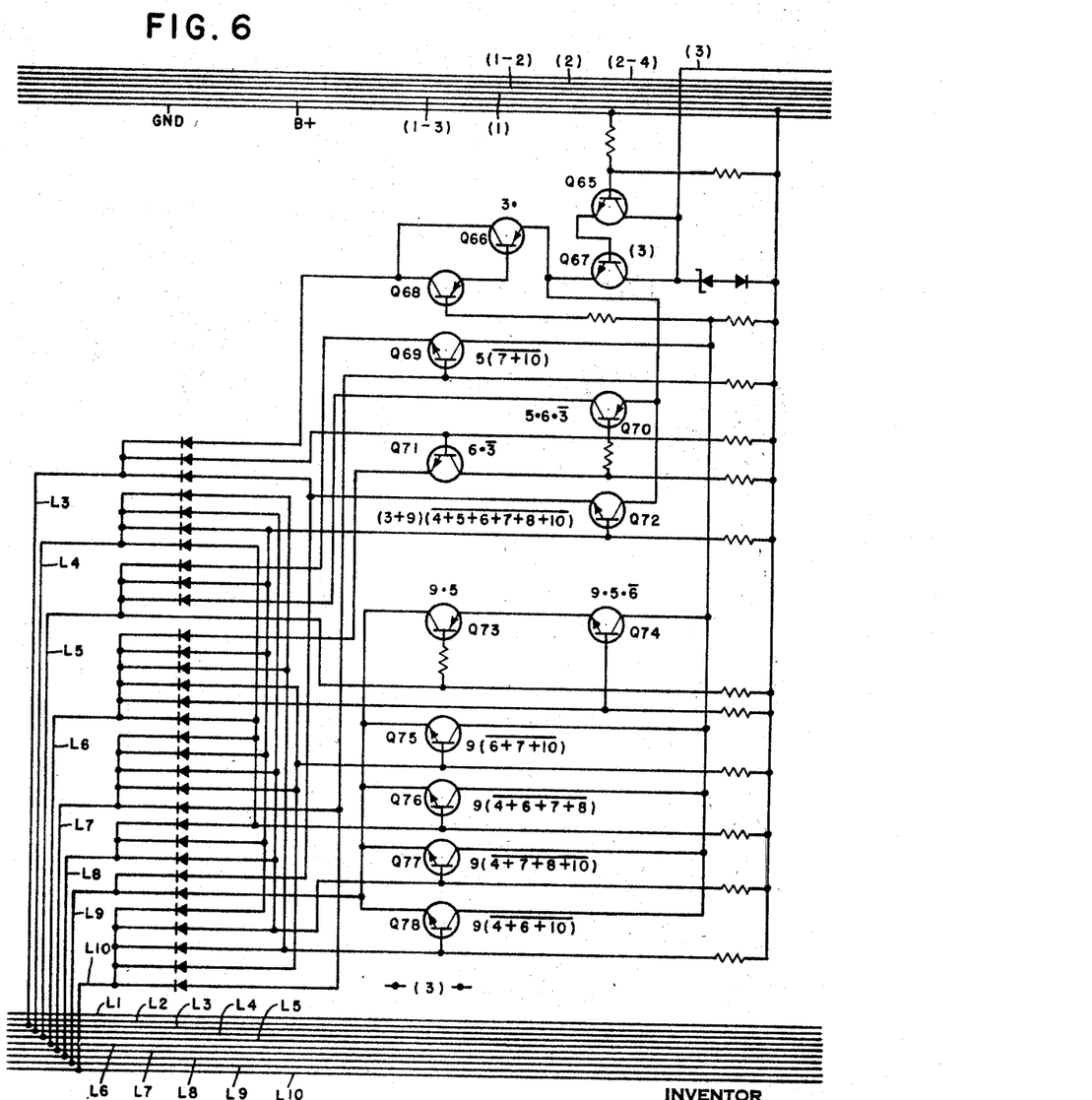
Figure 7:
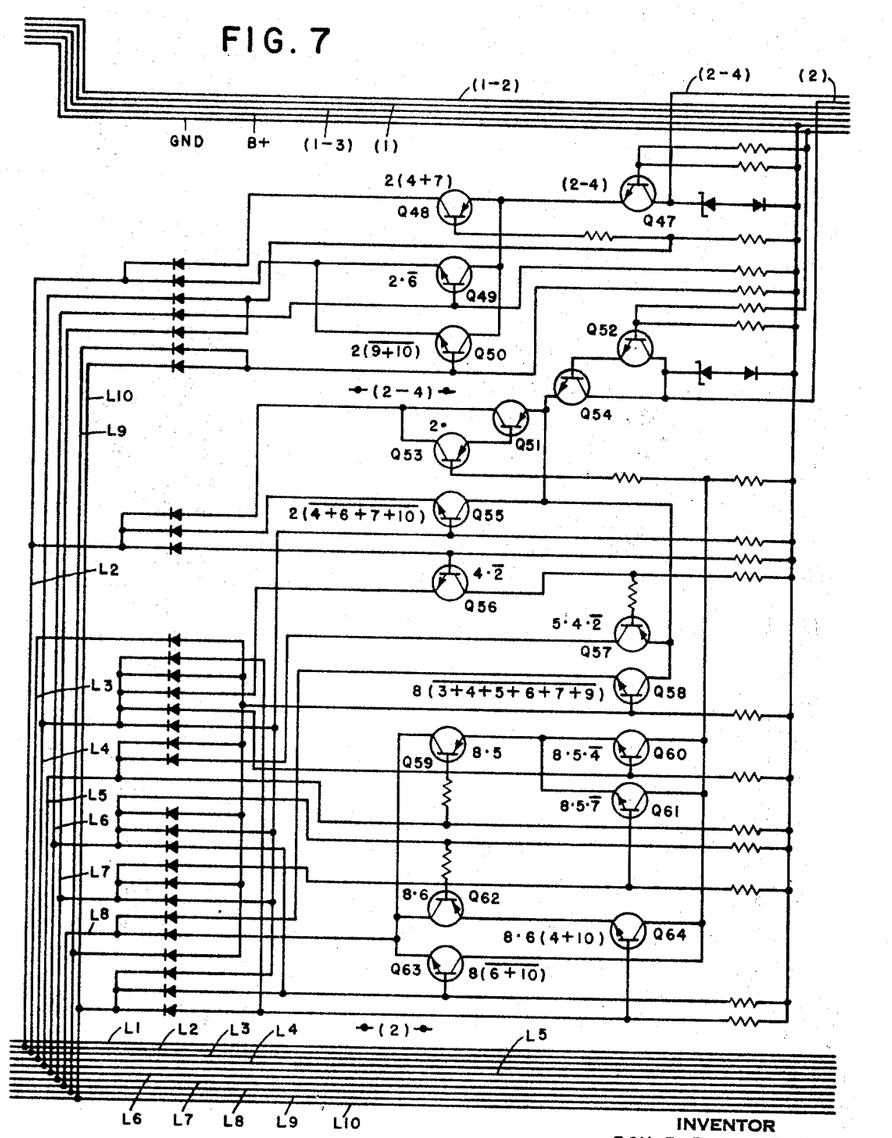
Figure 8:
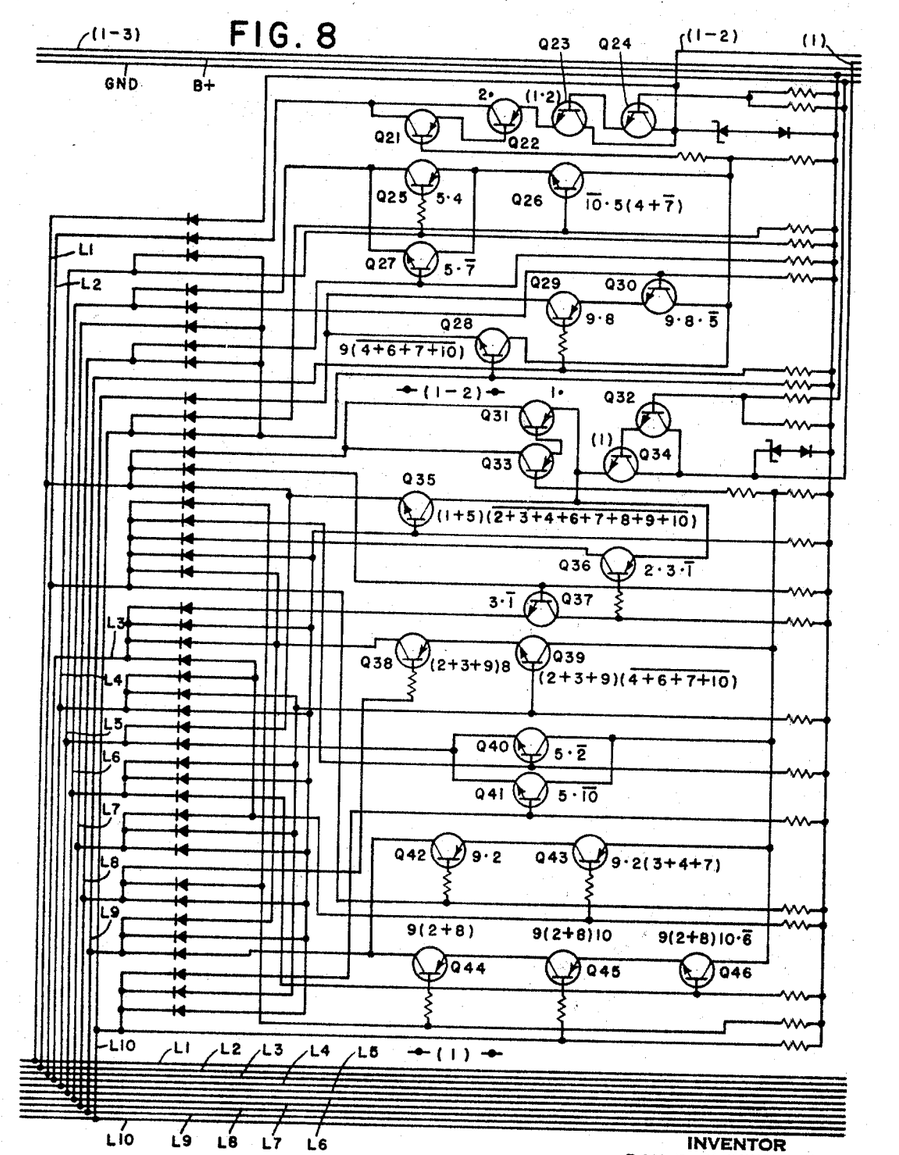
Figure 9:
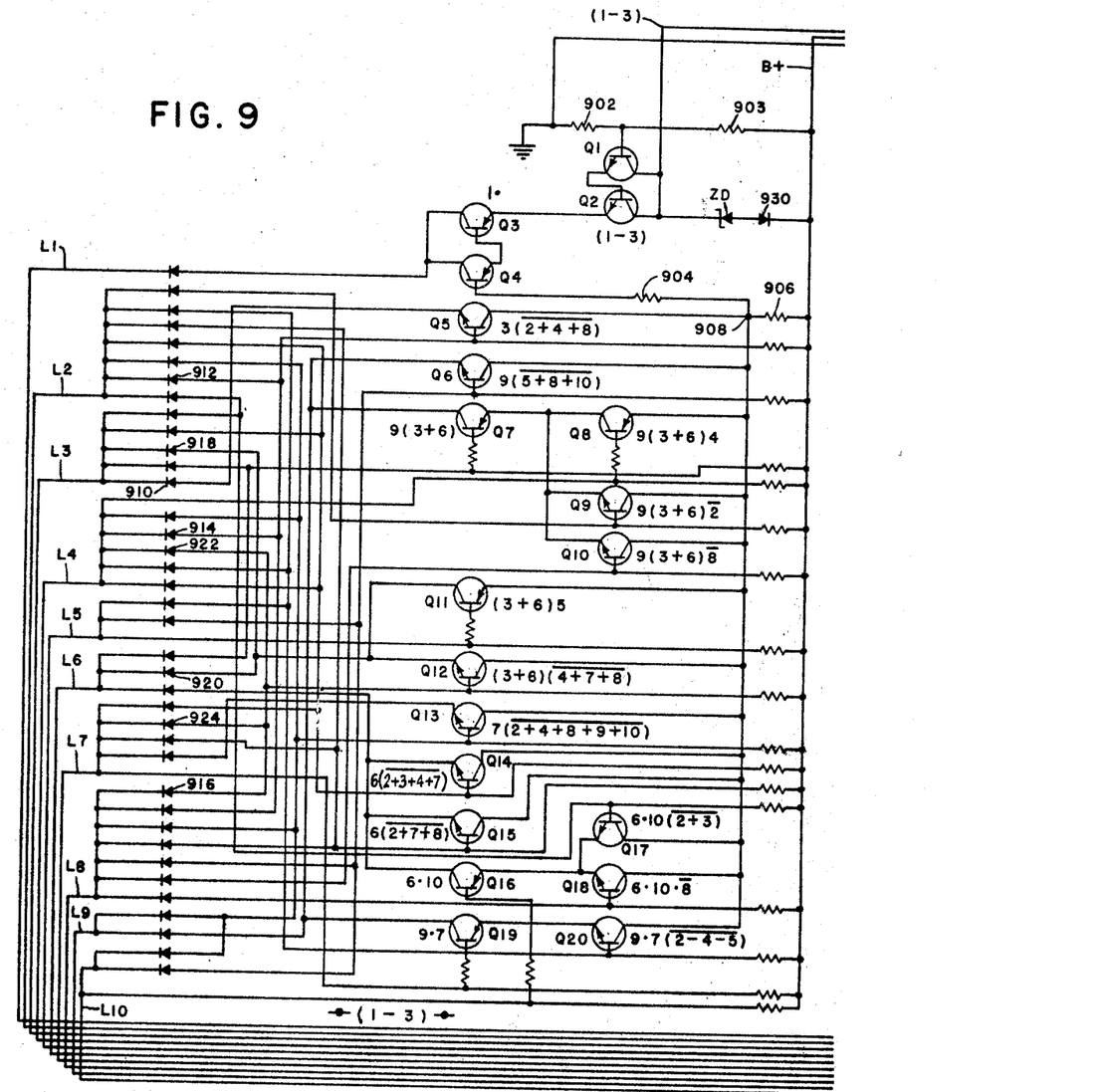

The electrical analog of each of the above Boolean expressions is shown in FIGS. 4–9. Each portion of the general Boolean expression for each of the 19 ball path indicator designations is noted along side the transistor logic element with which it is most closely associated. The ball path computer circuitry associated with each individual indicator indicia is segregated from adjoining circuitry by the related ball path indicator indicia symbol inscribed in the middle of each sheet of drawings and set off by dotted bars. For example, only circuitry associated with the (1–3) indicia is shown in FIG. 9 and includes transistors Q1–Q20, whereas circuitry for the (1–2) indicia including transistors Q21 and Q30 and the (1) indicia including transistors Q31–Q46, is shown in FIG. 8. Likewise, circuitry for the (2–4) indicia including transistors Q47–Q50 and (2) indicia including transistors Q51–Q64, is shown in FIG. 7, and circuitry for the (3) indicia including transistors Q65–Q78, is shown in FIG. 6. In FIG. 5 is shown the circuitry for the (4–8) indicia including transistors Q79–Q81, for the (7A) indicia including transistors Q82–Q84, for the (5–8) indicia, for the (5–9) indicia including transistors Q85–Q88, for the (3–6) indicia including transistors Q89–Q92, and for the (3–5) indicia including transistors Q93–Q105.

In FIG. 4 is shown the circuitry for the (10B) indicia, for the (6) indicia including transistors Q106–Q107, for the (6–9) indicia including transistors Q108–Q109, for the (7B) indicia including transistors Q110–Q112, for the (10A) Q113–Q120, for the (8–9) indicia including transistors Q121–Q122, and for the (4) indicia including transistors Q123–Q128.

To aid in understanding the invention, there will now be described in detail, the operation of the portion of the circuitry shown in FIG. 9 which performs the function represented by the following Boolean expression:

$$(1-3)=1[(3+6)[5+(\overline{4+7+8})]+3(\overline{2+4+8})]$$

This expression reads as follows. The (1–3) ball path indicator indicia will be actuated in the manner described above, if bowling pins numbers 1 and 3 or 6, and the five remain standing; or if pins 1 and 3 or 6, and not the 4 or 7 or 8 remain standing; or if pins 1 and 3 and not the 2 or the 4 or the 8 remain standing.

Referring to FIG. 9, the transistors Q1 and Q2 are the Readout transistors and are the equivalent of transistor QL3 of FIG. 13, transistor Q2 being a preamplifier for transistor Q1. Serially connected resistors 902 and 903 are the equivalent of resistors R4 and R5 of FIG. 13. Transistors Q3 and Q4 are the primary AND unit of the (1–3) ball path computer circuitry, and are the equivalent of transistor QL1 of FIG. 10, transistor Q4 being a preamplifier for transistor Q3. Serially connected resistors 904 and 906 are the equivalent of resistors R1 and R2 of FIG. 10.

Transistors Q3 and Q4 will conduct when line L1 is grounded, indicating the detection of a number 1 pin, and when the junction point 908 of resistors 904 and 906 is also grounded. Transistor Q5 represents an AND NOT unit and is the equivalent of transistor QL2 of FIG. 11. Transistor Q5 is utilized to implement the expression, pin number 3 and not the 2 or the 4 or the 8 is standing. The emitter of transistor Q5 is connected to line L3 through a diode 910 and is grounded when the number 3 pin is detected, and line L3 is consequently grounded. The base of transistor Q5 is connected to an OR unit comprising diodes 912, 914, 916, each of which are respectively connected to lines L2, L4, L8. If any of pins 2, 4, 8 are detected then respective lines L2, L4, L8 will be grounded, thereby grounding the base of transistor Q5 and preventing the transistor from conducting. Therefore junction point 908 will not be grounded, the AND unit represented by transistors Q3 and Q4 will not conduct, and there will be no Readout signal from the (1–3) computer circuitry.

In summary, if the pins 1 and 3 are standing in a given combination of standing pins, and none of the pins 2, 4, or 8 are standing, transistors Q1, Q2, Q3, Q4 will conduct thereby signalling that a (1–3) ball path indicia should be actuated, since transistor Q3, the number 1 pin transistor has its collector grounded through Line L1 and since point 908 is also grounded through the conduction of the AND NOT transistor Q5.

Transistor Q11 is another AND unit, the emitter of which is connected to junction point 908 and its collector is connected to an OR unit comprising diodes 918 and 920. It will be seen that if lines L3 or L6 are grounded, the collector of transistor Q11 will also be grounded. The base of transistor Q11 is connected to Line L5. Therefore if Line L5 is also grounded indicating the presence of pin number 5, (3+6) then the expression 5 (3+6) is satisfied. Transistor Q11 will then conduct and point 908 will be grounded. Hence, transistors Q1, Q2, Q3, Q4 will conduct if, in a given combination of standing pins, the 1 and the 3 pins, or the 6, and the 5 pins are standing.

Transistor Q12 is connected as an AND NOT unit. Therefore its emitter is connected through diodes 918, 920 comprising an OR unit with to Lines L3 and L6. The base of transistor Q12 is connected to an OR unit comprising diodes 922, 924, and 916. Accordingly, transistor Q12 will conduct if either Lines L3 or Line 6 are grounded thereby providing a ground for a junction point 908 but transistor Q12 will not conduct if Lines L4, L7, or L8 are grounded. Therefore, an indicia actuating signal will be read out of transistor Q1, Q2 if, in a given combination of standing pins, the 1 and the 3 or the 6 appear, and the 4 or the 7 or the 8 pin is not standing.

For the sake of brevity, the logic circuits comprising the remaining ball path computer circuitry will not be described. However, by following the explanation given above in connection with the (1–3) ball path indicia actuating circuit, each of the general Boolean expressions for 19 indicia actuating circuits may be traced if desired.

It will be noted that with the exception of the (5–8) and (10B) circuitry, which are direct lines from the number 5 and 10 pin detector switches NGR5c, NGR10c respectively, each actuating circuit group for an individual ball path indicia has at least a Readout transistor and associated Readout circuitry, and an OR circuit comprising a plurality of diodes connected in an OR unit arrangement to certain of input lines L1–L10. In addition, certain of the circuits have a Zener diode and polarity protection diode connected in series with line 100 and the Readout unit transistors. For example, see Zener diode ZD and diode 930, FIG. 9. These components assure that the proper voltage and polarity is applied to the Readout and primary AND units from whatever source of D.C. is selected.

Referring again to FIG. 1, it will be noted that lines OL(1–3)–(10B) are connected to level 1 of stepper relay BP in a predetermined order of priority. Since stepper relay BP always starts its search from a zero contact position and advances until a closed ball path computer circuit is found, when a ball path of higher priority has been selected, it is not possible for a given pin combination of lower priority to be selected. Thus, if a starting pin combination is not one of the (1–3) combinations, then stepper relay BP will advance to line OL(1) contact, and so on until a grounded line is found. However, it will be understood that stepper relay BP will stop its search when the first grounded line in order of priority is reached, even though other lines of lower priority may be grounded.

After the rolling of a second ball of a pin-spotting machine whose ball path has been computed, it is necessary that the wiping arms of stepper BP be returned to zero, to condition it for searching for a new ball path after the first ball of the next succeeding frame is rolled. Accordingly, after relay BP1 (FIG. 2) is deenergized when stepper relay SR1 steps from step 7 to step 8, normally closed contacts BP1c (FIG. 1), connected between interrupter contacts 104 and ground via contacts BP o.n., close. Contacts BP o.n. are the conventional cam operated "off normal" contacts of stepper relay BP and are closed when the wiping arms are off step 0. Therefore, closing of normally closed contact BP1c energizes the coil of stepper relay BP and causes it to advance through action of interrupter contacts 104 until step zero is reached and contact BP o.n. again open, thereby stopping further advancement of the stepper relay.

While the present invention has been disclosed by means of specific illustrative embodiments thereof, it would be obvious to those skilled in the art that various changes and modifications in the means of operation, description or in the apparatus may be made without departing from the spirit of the invention as defined in the appended claims.

I claim:

1. In an optimum ball path selection computer for a bowling ball path indicating system, in combination, a ball path selection stage, means for coupling standing and fallen pin position information to said stage, said stage including a plurality of electrical circuit paths, substantially all of said circuit paths each being individually representative of a Boolean expression for a selected group of standing and fallen pins, means operative in response to said pin position information and independent of the number of pins in the combination standing for selectively actuating and combining selected ones of said circuit paths, according to the standing and fallen pin combinations represented by said pin position information, to derive a signal representative of a selected Boolean expression for an optimum ball path for knocking down the maximum number of pins in each pin combination, and output means for propagating said signal from said stage.

2. In an optimum ball path selection computer for a bowling ball path indicating system, in combination, a ball path selection stage, means for coupling standing and fallen pin position information to said stage, said stage including a plurality of electrical circuit paths, substantially all of said circuit paths each being individually representative of a Boolean expression for a selected group of standing and fallen pins, some of said circuit paths including at least one logic unit, means operative in response to said pin position information and independent of the number of pins in the combination standing for selectively actuating said logic units and combining selected ones of said circuit paths, according to the standing and fallen pin combinations represented by said pin position information, to derive a signal representative of a selected Boolean expression for an optimum ball path for knocking down the maximum number of pins in each pin combination, and output means for propagating said signal from said stage.

3. The invention defined in claim 2 wherein said logic unit is selected from the group comprising AND, AND NOT and OR units.

4. In an optimum ball path selection computer for a bowling ball path indicating system, in combination, a ball path selection stage, means for coupling information representative of identifying symbols of individual selected standing pins to said stage, said stage including a plurality of electrical circuit paths, substantially all of said circuit paths each being individually representative of a Boolean expression for a selected group of standing and fallen pins, means operative in response to said standing pin symbol information and independent of the number of pins in the combination standing for selectively actuating and combining selected ones of said circuit paths, according to the standing and fallen pin combination represented by said standing pin identity symbol information, to derive a signal representative of a selected Boolean expression for an optimum ball path for knocking down the maximum number of pins in each pin combination, and output means for propagating said signal from said stage.

5. In a bowling ball path indicating system of the type having means for detecting the identity of standing pins on a pin deck, an optimum ball path selection computer, and indicating means having selectable indicia with actuating means for each indicia energized by said computer to indicate the optimum ball path for a selected pin combination, said computer comprising a ball path selection stage, means for coupling detected standing pin identity information to said stage, said stage inccluding a plurality of electrical circuit paths having active and passive states, substantially all of said circuit paths each being individually representative of a Boolean expression for a selected group of standing and fallen pins, some of said circuit paths including at least one logic unit, means aperative in response to said pin position information and independent of the number of pins in the combination standing for selectively actuating said logic units and activating, according to the standing and fallen pin combination represented by said pin identity information, selected ones of said circuit paths to provide an activated, combined circuit path representative of a selected Boolean expression for an optimum ball path for knocking down the maximum number of said pins in each pin combination, said combined circuit path being coupled to one of said indicia actuating means and operative when activated to effect energization of said associated indicia actuatng means.

6. In a bowling ball path indicating system of the type having means for detecting the identity of standing pins on a pin deck, an optimum ball path selection computer, and indicating means having selectable indicia with actuating means for each indicia energized by said computer to indicate the optimum ball path for a selected pin combination, said computer comprising a ball path selection stage, means for coupling detected standing pin identity information to said stage, said stage including a plurality of logic units including AND and OR logic units having active and passive states, some of said logic units being individually representative of a Boolean expression for one or more standing or fallen pins, means operative in response to said pin position information and independent of the number of pins in the combination standing for selectively activating said logic units, according to a standing and fallen pin combination represented by said pin identity information, to provide an electrical circuit path representative of a selected Boolean expression for an optimum ball path for knocking down the maximum number of said pins in each pin combination, said electrical circuit path being coupled to one of said indicia actuating means and operative when activated to effect energization of said associated indicia actuating means.

7. In a bowling ball path indicating system of the type having means for detecting the identity of standing pins on a pin deck, an optimum ball path selection computer, and indicating means having selectable indicia with actuating means for each indicia energized by said computer to indicate the optimum ball path for a selected pin combination, said computer comprising a ball path selection stage, means for coupling detected standing pin identity information to said stage, said stage including a plurality of electrical circuit paths having active and passive states, substantially all of said circuit paths each being individually representative of a Boolean expression for a selected portion of a combination of standing and fallen pins, some of said circuit paths including at least one logic unit, said paths being arranged into discrete groups, each group being representative of a selected Boolean expression for an optimum ball path for knocking down the maximum number of said pins in a selected pin combination, each group having an output coupled to one of said indicia actuating means and operative, when actuated, to effect energization of said associated actuating means, and means operative in response to said pin position information and independent of the number of pins in the combination standing for selectively actuating said logic units to form, according to the standing and fallen pin combination represented by said pin identity information, activated circuit path in at least one of said groups for actuating said associated group output.

8. In a bowling ball path indicating system of the type having means for detecting the identity of standing pins on a pin deck, an optimum ball path selection computer, and indicating means having selectable indicia with actuating means for each indicia energized by said computer to indicate the optimum ball path for a selected pin combination, said computer comprising a ball path selection stage, means for coupling detected standing pin identity information to said stage, said stage including a plurality of electrical circuit paths having active and passive states, substantially all of said circuit paths each being individually representative of a Boolean expression for a selected group of standing and fallen pins, means operative in response to said pin position information for selectively activating, according to the standing and fallen pin combination represented by said pin identity information, selected ones of said circuit paths to provide activated combined circuit paths each representative of a selected Boolean expression for an optimum ball path for knocking down the maximum number of said pins in each pin combination, said combined circuit paths having outputs arranged in accordance with a predetermined order of priority, and means for sequentially scanning said combined circuit path outputs to search for activated paths having the highest priority wherein said scanning means comprising a stepper relay having first and second levels and rows of contacts on each level, and wiping arms associated with each level for sequentially and concurrently engaging each contact in corresponding rows, each of said outputs of said combined circuit paths from each group being connected individually to a discrete contact of said first level, said contacts being arrayed in a predetermined order of priority, said indicia being connected to contacts of said second level in correspondence with the optimum ball paths represented by said outputs of said combined circuit paths, said indicia actuating means being connected to the wiping arm of said second level, and means for energizing said indicia actuating means connected to said wiping arm of said first level and activated whenever an activated combined circuit path output is detected.

9. The invention defined in claim 10 including indexing means for selectively indexing said stepper relay to search for activated combined circuit path outputs, and means operative to incapacitate said indexing means whenever an actuated output is detected.

10. The invention defined in claim 11 including means operative in response to rolling of the next ball of a bowling game playing frame for deactuating said indicia and recycling said stepper relay to its zero contact position.

References Cited

UNITED STATES PATENTS 3,212,779   10/1965   Gruss et al.
3,223,416   12/1965   Blewitt.

OTHER REFERENCES

Richard, R. K.; Arithmetic Operations in Digital Computers; Van Nostrand; published 1955; pages 39, 50. T.K.78883R5.

ANTON O. OECHSLE, Primary Examiner

C. STEWART, Assistant Examiner